United States Patent
Hergott et al.

(10) Patent No.: US 6,843,713 B1
(45) Date of Patent: Jan. 18, 2005

(54) METHOD AND MEANS FOR ENCASING SAUSAGE

(75) Inventors: Steven P. Hergott, West Des Moines, IA (US); David S. Hamblin, Norwalk, IA (US); Michael J. Hardy, West Des Moines, IA (US)

(73) Assignee: Townsend Engineering Company, Des Moines, ID (US)

( * ) Notice: Subject to any disclaimer, the term of this patent is extended or adjusted under 35 U.S.C. 154(b) by 10 days.

(21) Appl. No.: 10/682,473

(22) Filed: Oct. 9, 2003

(51) Int. Cl.[7] ............................................... A22C 11/00
(52) U.S. Cl. ........................................................ 452/37
(58) Field of Search .............................. 452/33, 30, 35, 452/36, 39, 45, 37

(56) References Cited

U.S. PATENT DOCUMENTS

| | | |
|---|---|---|
| 990,547 A | 4/1911 | Gunuskey |
| 1,395,967 A | 11/1921 | Merli et al. |
| 2,568,491 A | 9/1951 | Edwards |
| 3,150,410 A | 9/1964 | Washburn |
| 3,195,176 A | 7/1965 | Washburn |
| 3,253,297 A | 5/1966 | Nuckles |
| 3,404,430 A | 10/1968 | Kielsmeier et al. |
| 3,480,449 A | 11/1969 | Sumption |
| 3,672,001 A | 6/1972 | Greider |
| 3,805,329 A | 4/1974 | Kollross |
| 3,805,480 A | 4/1974 | Cherio et al. |
| 3,826,852 A | 7/1974 | Levaco et al. |
| 3,952,370 A | 4/1976 | Greider |
| 3,964,236 A | 6/1976 | Smith |
| 4,112,546 A | 9/1978 | Muller |
| 4,202,075 A | 5/1980 | Michel et al. |
| RE30,390 E | 9/1980 | Kupcikevicius et al. |
| 4,257,146 A | 3/1981 | Karp |
| 4,434,527 A | 3/1984 | Staudenrausch et al. |
| 4,437,209 A | 3/1984 | Durovon |
| 4,438,545 A | 3/1984 | Kupcikevicius et al. |
| 4,489,460 A | 12/1984 | Nausedas |
| 4,525,895 A | 7/1985 | Raudys |
| 4,580,316 A | 4/1986 | Gunter |
| 4,593,433 A | 6/1986 | Nausedas |
| 4,642,848 A | 2/1987 | Kollross |
| 4,649,602 A | 3/1987 | Kupcikevicius |
| 4,683,617 A | 8/1987 | Raudys |
| 4,768,261 A | 9/1988 | Nakamura |
| 4,893,377 A | 1/1990 | Evans et al. |
| 4,970,758 A | 11/1990 | Naples et al. |
| 4,991,260 A | 2/1991 | Naussedas |
| 5,046,219 A | 9/1991 | Stanley |
| 5,092,814 A | 3/1992 | Kasai et al. |
| 5,147,239 A | 9/1992 | Staudenrausch |
| 5,273,482 A | 12/1993 | Beckman et al. |
| 5,297,983 A | 3/1994 | Mueller et al. |
| 5,352,151 A | 10/1994 | Piereder |
| 5,354,228 A | 10/1994 | Smith et al. |
| 5,399,213 A | 3/1995 | Oxley |
| 5,512,012 A * | 4/1996 | Lendle et al. .................. 452/35 |

(List continued on next page.)

FOREIGN PATENT DOCUMENTS

| | | |
|---|---|---|
| DE | 1136604 | 9/1962 |
| DE | 4232759 | 3/1994 |
| DE | 29819328 U1 | 10/1998 |
| DE | 10001423 A1 | 1/2000 |
| EP | 0379123 | 7/1990 |
| FR | 2780246 | 12/1999 |

*Primary Examiner*—Thomas Price

(57) ABSTRACT

A method of advancing a sausage casing mounted on a stuffing tube into a twisting mechanism includes placing a hollow natural sausage casing on the outside surface of a stuffing tube and engaging the casing with a roller. The roller then forces the casing to slide toward the discharge end of the stuffing tube. The roller may be attached to an arm that has its height controlled by the rotation of a cam. By controlling the arm height the cam controls the feed pattern of the casing.

6 Claims, 2 Drawing Sheets

U.S. PATENT DOCUMENTS

| | | |
|---|---|---|
| 5,743,792 A | 4/1998 | Hanten et al. |
| 5,813,906 A | 9/1998 | Phillips |
| 5,830,050 A | 11/1998 | Nakamura et al. |
| 5,842,914 A | 12/1998 | Vermeer et al. |
| 6,050,888 A | 4/2000 | Nakamura et al. |
| 6,056,635 A | 5/2000 | Vermeer et al. |
| 6,066,035 A | 5/2000 | Hergott et al. |
| 6,066,036 A | 5/2000 | Carollo |
| 6,139,416 A | 10/2000 | Toepfer |
| 6,524,177 B2 | 2/2003 | Bolzacchini |
| 6,572,464 B1 | 6/2003 | Hergott et al. |
| 6,585,580 B1 * | 7/2003 | Hergott et al. ............ 452/32 |
| 6,659,853 B1 | 12/2003 | Hergott et al. |
| 6,659,854 B1 | 12/2003 | Hergott et al. |
| 6,669,545 B1 * | 12/2003 | Hergott et al. ............ 452/33 |

\* cited by examiner

METHOD AND MEANS FOR ENCASING SAUSAGE

BACKGROUND OF THE INVENTION

Sausages have been traditionally made by filling the natural intestines of sheep or other animals, with a sausage product whereupon the filled natural casing was formed into links for cooking. In more modern times, sausages are predominantly made by introducing an emulsion into an artificial casing, which encases the sausage material through linking and preliminary cooking. Machines for making sausages with artificial casings have a high volume capability (up to 30,000 sausages per hour). Efforts have been made to use these high-speed machines with natural casings. However, because of the nature of the natural casings including their relatively shorter and variable length and including their relatively shorter and variable length and non-uniform diameter, modern sausage encasing machines have not achieved the volume and capacity with natural casings as they do with artificial casings.

It is therefore a principal object of this invention to provide a method of advancing a natural casing along the length of a hollow meat stuffing tube that improves the state of the art.

A further object of this invention is to provide a method which uses a roller to advance a casing toward the discharge end of a stuffing tube.

A still further object of this invention is to provide a method of advancing an encasing of a sausage that can be controlled by a cam.

These and other objects will be apparent to those skilled in the art.

BRIEF SUMMARY OF THE INVENTION

A method of advancing a natural casing along the length of a hollow meat stuffing tube using a roller. The method includes placing a hollow natural casing on a hollow stuffing tube, then placing one or more cylindrical rollers on top of the casing, forcing the casing into engagement with a stuffing tube, and finally rotating the roller to slide the casing toward the discharge end of the stuffing tube. The roller can be mounted on an arm of a post to control the raising and lowering of the roller. The arm determines when the roller comes in contact with the casing.

DESCRIPTION OF THE EMBODIMENTS OF THE INVENTION

The term "emulsion" as used herein includes meat or any other edible substance.

Figure 1:
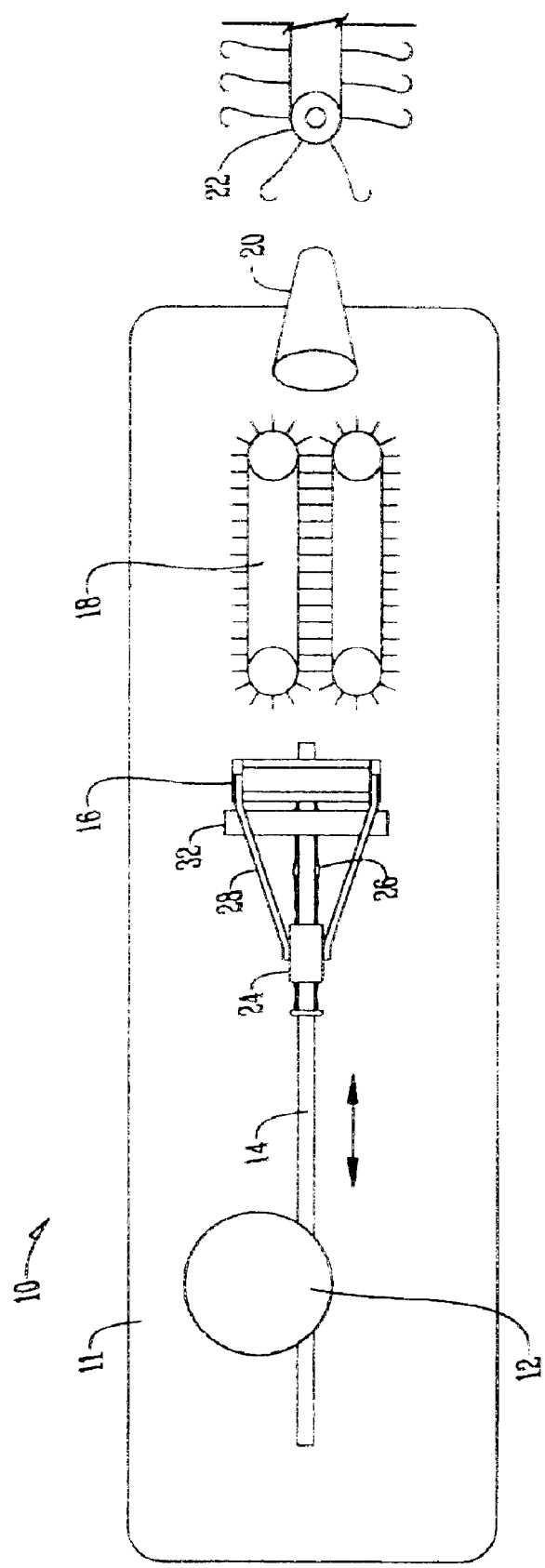
FIG. 1 is a plan view of a sausage making machine showing the conventional components.
Figure 2:
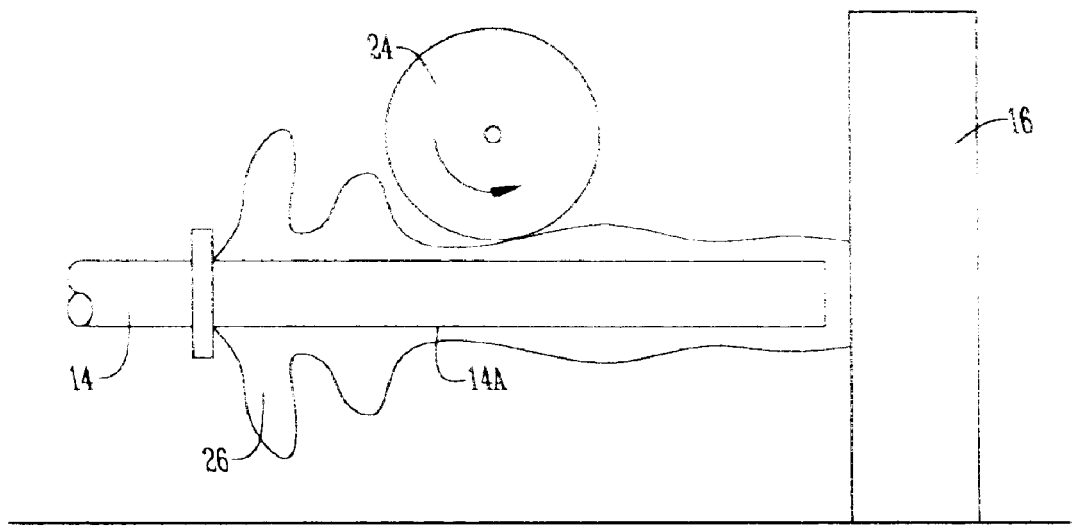
FIG. 2 is a plan side view of the automatic sausage casing roller system.

With reference to FIG. 1, a conventional sausage making machine 10 has a frame 11, a pump 12 connected to a source of emulsion (not shown), and a slidable stuffing tube 14 that has a discharge end 14A (FIG. 2). The sausage making machine 10 further has a twisting mechanism 16, a linking mechanism 18, a discharge horn 20, and a conveyor 22.

With reference to FIG. 2 one can see an automatic advancing roller 24 of this of the sausage making machine 10. The roller 24 is placed to come into contact with a sausage casing 26 that is on the stuffing tube 14. In operation the casing 26 is mounted onto the stuffing tube 14. The casing 26 is then fed toward the twisting mechanism 16 by the controlled roller 24. The roller 24 can be made of several materials, including but not limited to: a hard material, a soft material, or pneumatic material that can be used to aid in the adjustment of pressure in the casing 26 to determine the rollers hardness. Multiple similar rollers could be integrated around the stuffing tube.

Figure 3:
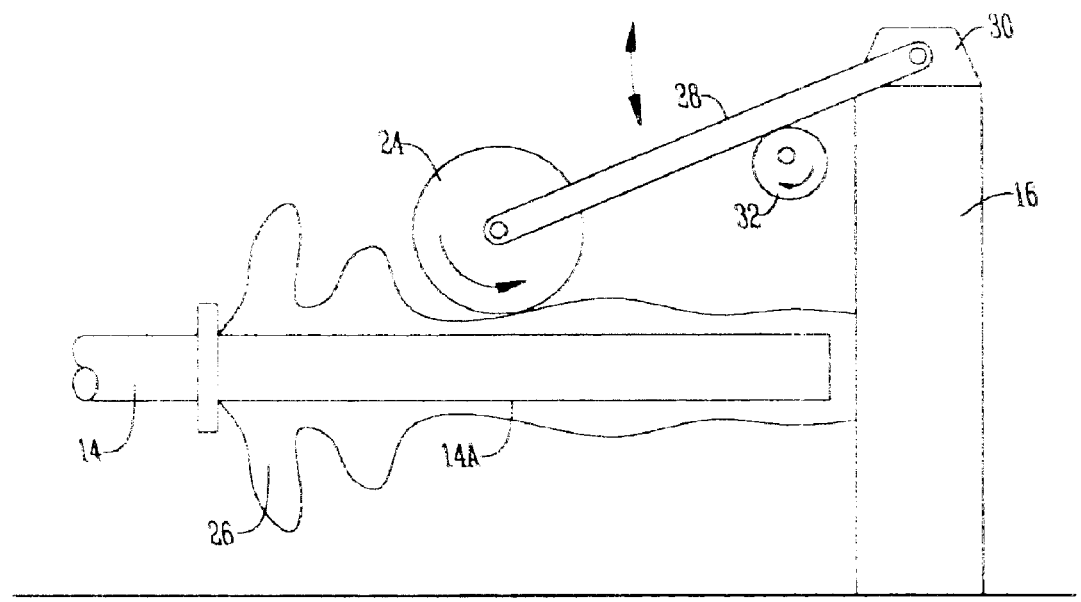
FIG. 3 is a plan side view of the automatic sausage casing roller wherein the roller is connected to an arm attached to a twisting mechanism.

FIG. 3 shows an embodiment of the present invention wherein the roller 24 is attached to an arm 28 that is connected to a base 30 on top of the twisting mechanism 16. In this embodiment the arm 28 comes into contact with a cam 32 that can determine the height of the arm 28. In operation the casing 26 on stuffing tube 14 is advanced into twisting mechanism 16 by roller 24. The roller 24 is rotatably attached to the base 30 by arm 28. The cam 32 rotates to raise and lower the arm 28 and therefore controls the height of the roller 24. Consequently, if the roller 24 is driven at a constant speed, the rotational rate of the cam 32 determines the feed pattern of the roller 24 and casing 26.

It can therefore be seen that by using a roller system this invention permits the automatic advancement of a casing in order to facilitate the accelerated process of filling natural casings. It will be appreciated by those skilled in the art that other various modifications could be made to the device without the parting from the spirit in scope of this invention. All such modifications and changes fall within the scope of the claims and are intended to be covered thereby.

What is claimed is:

1. A method of advancing a natural casing along the length of hollow meat stuffing tube, comprising, placing a hollow natural casing on the outside surface of a hollow stuffing tube having a meat emulsion discharge end, placing at least one cylindrical roller transversely with respect to a longitudinal axis of the stuffing tube in engagement with the casing on the stuffing tube, and compressively forcing the casing into engagement with an outside surface of the stuffing tube, and rotating the roller to slide the casing towards the discharge end of the stuffing tube.

2. The method of claim 1 wherein the roller is a pneumatic roller.

3. The method of claim 2 wherein the pneumatic roller is pressure adjustable to determine its hardness.

4. The method of claim 1 wherein the roller is mounted on arms extending rearwardly from a downstream post, raising and lowering the roller into and out of contact with the casing, and rotating the roller to slide the casing towards the discharge end of the stuffing tube.

5. An apparatus for advancing a natural casing along the length of a sausage encasing machine having a stuffing tube and a twisting mechanism, comprising, a base securably connected to the twisting mechanism;

at least one arm having a first and second end rotatably connected to the base at a first end and extending toward the stuffing tube;

a cylindrical roller rotatably connected to the second end of the arm and engaging the stuffing tube.

6. The apparatus of claim 5 further comprising a cam transversely engaging the arm so that the cam can control the vertical movement of the arm.

* * * * *